United States Patent

Ishino et al.

[11] Patent Number: 5,861,184
[45] Date of Patent: Jan. 19, 1999

[54] PACKED AND FROZEN SUSHI PRODUCT AND PROCESS FOR THAWING THE SAME

[75] Inventors: Yuji Ishino; Hironobu Kadoya, both of Ishikawa-ken, Japan

[73] Assignee: Polastar Company Limited, Japan

[21] Appl. No.: 651,468

[22] Filed: May 23, 1996

[30] Foreign Application Priority Data

May 31, 1995 [JP] Japan ..................................... 7-169146
May 23, 1995 [JP] Japan ..................................... 7-159760

[51] Int. Cl.⁶ ............................. A23L 1/01; A23L 3/365; H05B 6/64
[52] U.S. Cl. ........................ 426/107; 426/126; 426/234; 426/412; 426/524; 219/729
[58] Field of Search .................... 426/89, 90, 92, 426/124, 129, 234, 241, 412, 524, 643, 107, 126, 127; 219/729

[56] References Cited

U.S. PATENT DOCUMENTS 4,713,510  12/1987  Quick et al. .............................. 426/126
5,239,153   8/1993  Beckett ..................................... 426/107

FOREIGN PATENT DOCUMENTS 52-20199    2/1977  Japan ..................................... 426/412
58-126744   7/1983  Japan ..................................... 426/129
63-137827   6/1988  Japan ..................................... 219/729
4-8258      1/1992  Japan ..................................... 426/234
5184314     7/1993  Japan ..................................... 426/241

Primary Examiner—Joseph W. Drodge
Attorney, Agent, or Firm—Ostrolenk, Faber, Gerb & Soffen, LLP

[57] ABSTRACT

A process for thawing a frozen sushi product of a type packed by a plastic film by a microwave oven is provided. Each of a packed frozen sushi product of a type packed by a plastic film in which the entire sushi product is covered with the plastic film, and a frozen sushi product of a type packed by a plastic film in which an upper portion of a sushi material is covered with an aluminum foil, and the entire sushi product is covered with a plastic film with the aluminum foil located therebetween, can be thawed in a microwave oven by heating it by an electromagnetic wave heating to rise the temperature of an exposed side of a shaped form of boiled rice to 40° C. or more, while rising the temperature of a contact area between the sushi material and the boiled rice portion to 15° C. or less, and stopping the electromagnetic wave heating, whereby the sushi material is heated by a heat possessed by the boiled rice portion, until the temperature of the contact area between said sushi material and the boiled rice portion reaches a level higher than 15° C. Thus, it is possible to use a microwave oven for thawing the frozen sushi product, and it is easy to thaw the frozen sushi product without heating the sushi material to a temperature exceeding 25° C.

4 Claims, 2 Drawing Sheets

PACKED AND FROZEN SUSHI PRODUCT AND PROCESS FOR THAWING THE SAME

BACKGROUND OF THE INVENTION

1. Technical Field of the Invention

The present invention relates to a packed and frozen sushi product being comprised of a shaped form of frozen boiled rice, a frozen sushi material which is preferably not heated, onto the frozen shaped form of boiled rice and a plastic films packing said frozen sushi material and frozen boiled rice, and a process for thawing the same. The packed and frozen sushi product according to the present invention is made by placing the sushi material (Gu) onto the shaped form of boiled rice, packing said sushi material and boiled rice with plastic film and freezing said sushi material and boiled rice together with plastic film. Further, packed and frozen sushi product according to the invention is made by placing the sushi material on the shaped boiled rice, freezing said sushi material boiled rice and packing said frozen sushi material and boiled rice with plastic film. More particularly, the present invention relates to a process for thawing a packed and frozen sushi product, which is capable of heating the shaped form of frozen boiled rice by an electromagnetic wave heating in a microwave over or the like to thaw the sushi material by a remaining heat of the shaped form of boiled rice. Further, the present invention relates to a packed and frozen sushi product which is suitable for thawing, and a process for thawing the same.

Yet further, the present invention relates to a process for thawing a packed and frozen sushi product and more particularly, to a process for thawing a packed and frozen sushi product, which includes heating a packed and frozen sushi product by an electromagnetic wave heating in a microwave oven and the like to thaw a sushi material by a remaining heat of the shaped form of boiled rice.

2. Description of the Related Art

In general, for example, to make a rod-like sushi product, a vinegared boiled rice is first shaped. Then, a sushi material comprised of a prepared boned fish such as a porgy, a salmon, a mackerel and the like is placed on the shaped form of rice such as vinegared boiled rice along with a white thin sheet of kelp (kombu in Japanese) made by boiling a piece of kelp in a stock seasoned by vinegar, sugar and salt, and the resulting mass is shaped. This shaped sushi mass is inserted into and packed in a bag made of a plastic film in a degassed manner. The resulting mass is frozen by brine, thereby producing a frozen sushi product comprising the frozen sushi material and the frozen boiled rice portion. Alternatively, a sushi shaped into a rod-like configuration is frozen by a liquid nitrogen or a liquefied carbon dioxide gas to freeze the sushi material and the boiled rice portion. This frozen rod-like sushi is placed into and packed in a bag made of a plastic film in a degassed manner, thereby producing a frozen sushi product with the sushi material and rice portion frozen.

For example, in such a sushi product frozen by brine, the degassing packing is carried out prior to the freezing and hence, the deposition of bacteria, the absorption of odor and the like do not occur in a freezing chamber. Therefore, this frozen sushi product is excellent in a sanitary aspect, as compared with a frozen sushi product made through a slow freezing by air blast or by liquid nitrogen or liquefied carbon dioxide gas, followed by a degassing packing. Thus, the sushi product frozen by brine can be stably preserved over a long period of three months or more at a preservation temperature of $-18°$ C. and further, can be preserved over a further long period of six months at a preservation temperature of $-50°$ C.

However, the frozen sushi product preserved as described above is thawed for use. Examples of the thawing method are a natural thawing method, a heating thawing method using a flowing ice, a heating thawing method using steam, a heating thawing method using warm water, an electromagnetic wave heating thawing method in a microwave oven, and the like. In the electromagnetic wave heating thawing method in the microwave oven, the thawing time is extremely short and the thawing yield is high. Therefore, the electromagnetic wave heating thawing method in the microwave oven is suitable for thawing the frozen sushi product. For example, for the rod-like sushi product, the natural thawing thereof at room temperature requires five hours, but the electromagnetic wave heating thawing method in the microwave oven can thaw the rod-like sushi product within a short time, e.g., four minutes, depending upon the type of the sushi material. Therefore, the thawing in the microwave oven is convenient, because it can immediately meet the demand for the sushi in an eating house.

When the thawing in the microwave oven is used, different heat values are generated at the frozen sushi material portion and the frozen boiled rice portion by absorption of an electromagnetic wave such as a high frequency wave. Moreover, a surface portion of the sushi product is heated relative to a central portion and hence, a portion of the sushi material is heated up to an undesirable temperature. Therefore, the thawing in the microwave oven has not been practically used.

Furthermore, in the case of a hand-shaped sushi, it is preferred that a boiled rice portion has a body warmth ($30°$ to $350°$ C.), while a sushi material portion has a temperature of $10°$ to $13°$ C., but in the case of a rod-like sushi, it is preferred that a boiled rice portion such as vinegared boiled rice and a sushi material portion have a temperature of $20°$ to $25°$ C. When the electromagnetic wave thawing method in the microwave over or the like is utilized for thawing a packed and frozen sushi product such as a hand-shaped sushi product or a rod-like sushi product, the sushi material of the sushi product is heated to a relatively high temperature, resulting in an injured taste of the sushi product. Therefore, it is relatively difficult to achieve the intended thawing.

SUMMARY OF THE INVENTION

Accordingly, it is an object of the present invention to solve the disadvantage that the sushi material placed on the shaped form of boiled rice is heated to a relatively high temperature by the electromagnetic wave heating in the microwave over or the like, resulting in the injured taste of the sushi.

It is a further object of the present invention to provide a packed and frozen sushi product having a sushi material placed on the shaped form of rice, and a process for thawing the same, wherein the sushi material is thawed to a proper temperature.

To achieve the above object, according to the present invention, there is provided a packed and frozen sushi product comprising a shaped form of frozen boiled rice, a frozen sushi material placed on an upper surface of the shaped form of frozen boiled rice, a first plastic film for covering the entire surface of the shaped form of frozen boiled rice having the frozen sushi material placed thereon, and a second plastic film for covering the entire surface of the shaped form of frozen boiled rice having the frozen sushi material placed thereon and covered with the first plastic film.

In addition, to achieve the above object, according to the present invention, there is provided a packed and frozen sushi product comprising a shaped form of frozen boiled rice, a frozen sushi material placed on an upper surface of the shaped form of frozen boiled rice, a first plastic film for covering the entire surface of the shaped form of frozen boiled rice having the frozen sushi material placed thereon, an aluminum foil disposed above the sushi material on the first plastic film for covering the sushi material, and a second plastic film for covering the entire surface of the sushi mass having the sushi material portion covered with the aluminum foil.

Further, to achieve the above object, according to the present invention, there is provided a process for thawing a frozen sushi product of a type packed by a plastic film, comprising the steps of heating the frozen sushi product including a shaped form of frozen boiled rice having a frozen sushi material placed thereon and packed by the plastic film, by an electromagnetic wave heating, thereby heating an exposed side of the shaped form of frozen boiled rice to a temperature of 40° C. or more, while heating a contact area between the sushi material and the shaped form of boiled rice to a temperature of 15° C. or less, and stopping the electromagnetic wave heating, whereby the sushi material portion is heated by a heat possessed by the shaped form of boiled rice, until the temperature of the contact area between the sushi material and the shaped form of boiled rice reaches a level higher than 15° C.

Yet further, to achieve the above object, according to the present invention, there is provided a process for thawing a packed and frozen sushi product comprising the steps of heating the frozen sushi product including a shaped form of frozen boiled rice having a frozen sushi material placed thereon and packed by packing plastic films with an aluminum foil disposed partially between the plastic films and located above the sushi material, by an electromagnetic wave heating, thereby heating an exposed side of the shaped form of boiled rice to a temperature of 40° C. or more, while heating a contact area between the sushi material and the shaped form of boiled rice to a temperature of 15° C. or less, and stopping the electromagnetic wave heating, whereby the sushi material portion is heated by a heat possessed by the shaped form of rice, until the temperature of the contact area between the sushi material and the shaped form of boiled rice reaches a level higher than 15° C.

The packed and frozen sushi product according to the present invention is a sushi product including a frozen sushi which is made by freezing a sushi material and a shaped form of boiled rice by any of a brine freezing, an air blast freezing, a nitrogen or carbon dioxide freezing and the like and which is packed by the plastic film. Particularly, it is preferable that the packed and frozen sushi product according to the present invention is a sushi product including a frozen sushi made through the brine freezing and packed by the plastic film. With such a packed and frozen sushi product, the frozen sushi material and the shaped form of rice can be thawed by the electromagnetic wave heating in a microwave oven or the like according to the present invention.

The packed and frozen sushi products according to the present invention include those of types covered double or multiple, for example, with two or more plastic films, i.e., a frozen sushi product of a type packed by plastic films in which the entire frozen sushi is covered with only plastic films; and a frozen sushi product of a type packed by plastic films in which the entire frozen sushi is covered with plastic films and a upper surface of a sushi material portion is further covered with an aluminum foil between said plastic films, i.e., a frozen sushi product of a type packed by plastic films and partially covered with an aluminum foil in which an upper portion of a sushi material is covered with an aluminum foil through a plastic film and further, the entire sushi is covered with a plastic film.

In the sushi product according to the present invention, it is preferable that the outer covering plastic film is formed thicker than the inner covering plastic film.

The frozen sushi product of the type packed by plastic films can be a frozen sushi product of a type having a sushi material disposed on a shaped form of boiled rice such as vinegared boiled rice, e.g., a frozen rod-like sushi product and a frozen hand-shaped sushi product. A single piece of sushi may be packed and frozen, but a plurality of pieces of sushi may be packed by plastic films and frozen all together.

The frozen sushi products of the type packed by the plastic films, which may be thawed according to the present invention, include a sushi product of a type with the entire sushi portion covered by only plastic films, and a sushi product of a type in which the entire sushi mass is covered by plastic films and the sushi material portion is covered with an aluminum foil between the plastic films, as described above. In each case, the final heating in the thawing of the sushi material portion is performed by a heat possessed by the boiled rice portion such as vinegared rice, which has been heated by an electromagnetic wave such as a high frequency wave.

According to the present invention, the heating of the frozen boiled rice portion by an electromagnetic wave in a microwave oven can be conducted to such an extent that the boiled rice portion is not burnt. However, the heating of the frozen sushi material by the electromagnetic wave is conducted at a temperature of 15° C. or less, preferably 20° C. or less, so that the thawed sushi material reaches a temperature not exceeding 25° C., preferably a temperature in a range of 20° to 25° C.

As a standard for conducting the heating of the sushi material at such a temperature, the temperature of the exposed side of the shaped form of boiled rice heated is of 40° C. or more, preferably in a range of 40° to 80° C., further preferably in a range of 20° C. or less.

The thawing of the sushi material of the packed and frozen sushi product according to the present invention is performed by the electromagnetic wave heating in the microwave oven, but preferred to be conducted mainly by utilizing the heat of the boiled rice portion heated by the electromagnetic wave heating. Therefore, the thawing of the sushi material of the packed and frozen sushi product according to the present invention is somewhat varied depending upon the preserving temperature for the packed and frozen sushi product, the magnitude of a microwave output from the microwave oven and the type of sushi material; however, for example, the thawing of the sushi material of the sushi product may be performed by the heat possessed by the shaped form of boiled rice by heating the shaped form of boiled rice in the microwave oven (which delivers a microwave output in a range of 500 to 600 W) for 2.5 to 5 minutes and then allowing it to settle by its own heat for 15 to 40 minutes, preferably, for 20 to 30 minutes.

By allowing the boiled rice portion to settle by its own remaining heat, the temperature of the sushi material of the sushi product can be risen to 15° C. or higher enough for eating, preferably 20° C. or higher, more preferably a range of 20° to 25° C.

In the frozen sushi of the type uniformly packed by only the plurality of plastic films placed in layers, the first plastic film is, for example, a polyethylene film disposed at an inner side, and the second plastic film is, for example, a nylon film disposed at an outer side.

In the packed and frozen sushi product of the type packed by the plastic films and partially covered with the aluminum foil according the present invention, the first plastic film is, for example, a polyethylene film disposed at an inner side, and the second plastic film is, for example, a nylon film disposed at an outer side. To cover the sushi material, an aluminum foil, i.e., a single or a plurality of aluminum foils, or an aluminum foil vapor-deposited or plated on a surface of one of the plastic films is disposed at a sushi material-covering location between the first and second plastic films.

In the packed and frozen sushi product according to the present invention, if the sushi material is covered with the aluminum foil when the sushi is packed by the packing material, the high frequency applied to the sushi material portion can be cut off by the aluminum foil, thereby avoiding the heating of the sushi material.

According to the present invention, the packing plastic film material is formed into a bag-like configuration, and the aluminum foil can be disposed above the sushi material. In this case, the opposite sides of the aluminum foil are covered with the plastic films, so that it may be prevented from coming into direct contact with the food portion and the high frequency wave. Therefore, the area of the aluminum foil contacting with the sushi material and the shaped form of boiled rice is covered double with the two plastic films to provide a structure such that the intrusion of the open air, moisture and bacteria can be avoided to the utmost.

In any of the frozen sushi product of the type packed by the plastic films and the frozen sushi product of the type packed by the plastic films and partially covered with the aluminum foil according to the present invention, the thawing thereof is performed by the electromagnetic wave heating. In any case, when the temperature of the exposed side of the shaped form of rice is risen to 40° C. or higher and the temperature of the contact area between the sushi material and the boiled rice portion is risen to 15° C. or lower, the electromagnetic wave heating is stopped, whereby the thawing of the sushi material portion is conducted by the remaining heat of the boiled rice portion, so that the temperature of the contact area between the sushi material and the boiled rice portion can be risen to a level higher than 15° C.

Therefore, the thawing in this manner ensures that the packed and frozen sushi product can be thawed by the microwave or the electromagnetic wave in the microwave oven without heating the sushi material during the thawing.

The frozen sushi product of the type packed by the plastic films according to the present invention is formed in such manner that the entire frozen sushi mass is covered with the plurality of plastic films, or the entire frozen sushi mass is covered with the plurality of plastic films and the upper portion of the sushi material is covered with the aluminum foil between the plastic films. Therefore, the frozen sushi product can be thawed while preventing the drying due to the evaporation of water by heating the frozen sushi product to rise the temperature of the exposed side of the shaped form of boiled rice to 40° C. or higher and rise the temperature of the contact area between the sushi material and the boiled rice portion to 15° C. or lower, and stopping the electromagnetic wave heating, whereby the sushi material portion is heated by the heat possessed by the shaped form of boiled rice, until the temperature of the contact area between the sushi material and the shaped form of rice reaches the level higher than 15° C. Thus, it is possible to use the microwave oven for thawing the packed and frozen sushi product.

Thus, as compared with the thawing of the prior art packed and frozen sushi product, the packed and frozen sushi product according to the present invention can be thawed without heating of the sushi material to a temperature exceeding 25° C. and without injury of the taste of the sushi. In addition, the thawing of the frozen sushi product can be achieved using the microwave oven which has suffered from a difficulty to thaw the frozen sushi product. Further, the thawing of the packed and frozen sushi product according to the present invention can be achieved in an extremely short time, as compared with the prior art packed frozen sushi product.

DETAILED DESCRIPTION OF THE PREFERRED EMBODIMENTS

Figure 1:
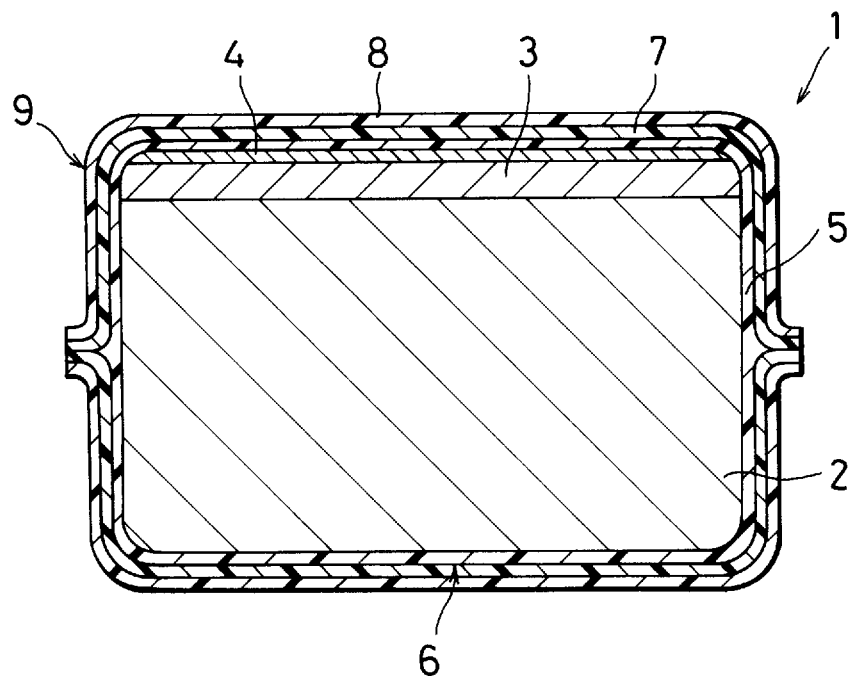
FIG. 1 is a front schematic sectional view of a frozen sushi product of a type packed by plastic films according to one embodiment of the present invention.

Referring to FIG. 1, a frozen sushi product 1 of a type packed by plastic films has a sushi material 3 placed on a shaped form of boiled rice 2, such as vinegared boiled rice, and a thin white sheet of kelp 4 placed on the sushi material 3, which are wrapped with a wrapping film 5. A package 6 provided by the wrapping film is inserted into a bag 9 which is formed by overlapping two laminate films each comprised of a polyethylene film 7 and a nylon film 8 with three ends bonded. Then, the package is degassed and frozen using brine. In this manner, the frozen sushi product 1 of the type packed by the plastic film is produced.

Figure 2:
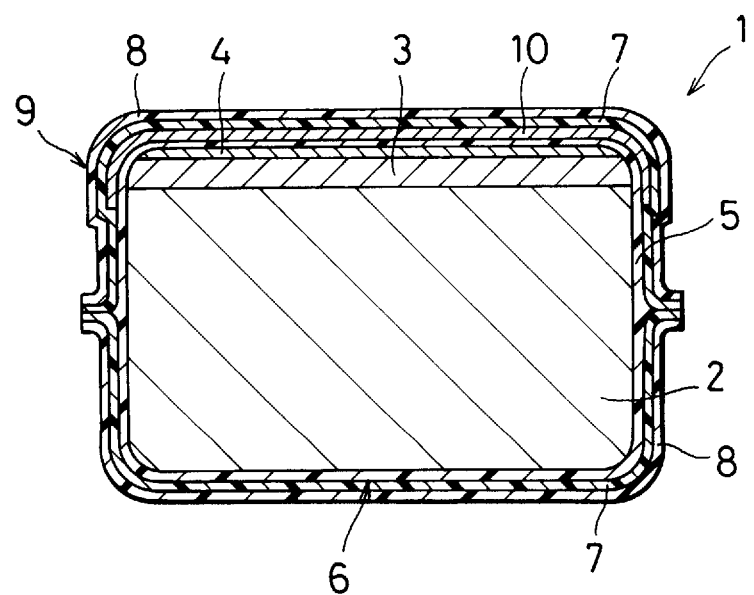
FIG. 2 is a front schematic sectional view of a frozen sushi product of a type packed by plastic films and partially covered with an aluminum foil according to another embodiment of the present invention.

Referring to FIG. 2, a frozen sushi product of a type packed by the plastic film has a sushi material 3 placed on a shaped form of boiled rice 2 and a white thin sheet of kelp 4, which are wrapped with a wrapping film 5 of a wrapping film package 6. An aluminum foil 10 is disposed on that portion of the wrapping film 5 on the sushi material 3. The wrapping film 5 is a wrapping-film package 6 covering the sushi material 3. The wrapping-film package 6 with the aluminum foil 10, placed on the portion thereof covering the sushi material 3, is inserted into a bag 9 which is formed by overlapping two laminate films each comprised of a polyethylene film 7 and a nylon film 8 in two layers with three ends bonded. Then, the package is degassed and frozen using brine. In this manner, the frozen sushi product 1 of the type packed by the plastic film 1 is produced.

Figure 3:
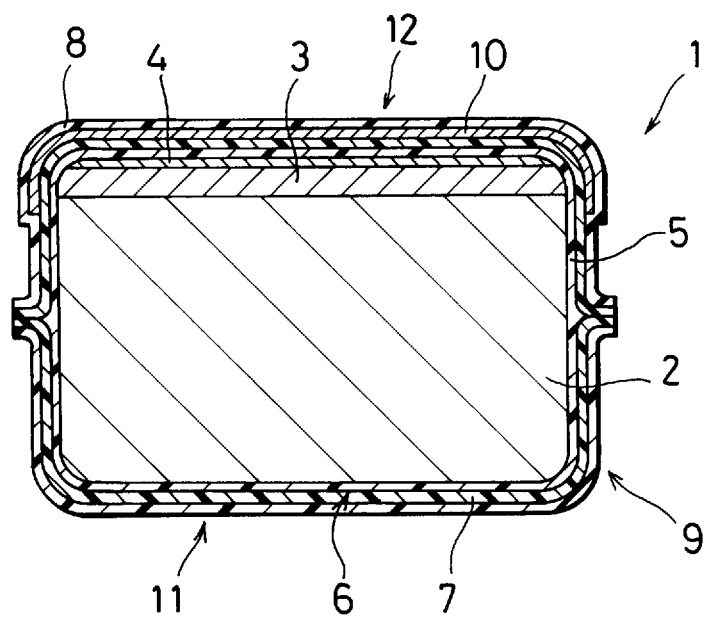
FIG. 3 is a front schematic sectional view of a frozen sushi product of a type packed by plastic films and partially covered with an aluminum foil according to a further embodiment of the present invention.

Referring to FIG. 3, a frozen sushi product 1 of a type packed by the plastic film, which is made in the same manner as the example shown in FIG. 2, has a sushi material 3 placed on a shaped form of boiled rice 2 and a white thin sheet of kelp 4, which are wrapped with a wrapping film 5, thereby forming a wrapping-film package 6.

In the embodiment shown in FIG. 3, a bag 9 is formed in such a manner that one side 11 is formed of a laminate film comprised of a polyethylene film 7 and a nylon film 8, and the other side 12 is formed of a laminate film comprised of a nylon film 7 with an aluminum foil 10 deposited on a partial area thereof and a polyethylene film 8. These laminate films are overlapped one on another, and three ends thereof are bonded. The wrapping-film package 6 is inserted into the bag 9 with the sushi material turned to the side having the aluminum foil deposited, and is degassed. The package is frozen using brine, whereby the packed frozen sushi product 1 is produced.

EXAMPLE 1

Using a box including a frame having a width of 55 mm and a length of 180 mm, an upper lid member vertically movable within the frame, and a bottom plate member, a pressed sushi was made. In this example, the shaped form of boiled vinegared rice (240 g) had a shape 55 mm wide, 24 mm high and 180 mm long, and a weight of 240 g.

For example, a white sheet of kelp having made by boiling a piece of kelp having a length of 185 mm, a width of 70 mm and a thickness of 0.5 mm in a stock seasoned by vinegar, sugar and salt and then cooling the boiled piece of kelp was placed onto the bottom plate member of the box, and tow tails of boned porgy (20 grams) having a width of 25 mm and a thickness of 3 mm, sprinkled with slat and pickled in vinegar and three tails of prawn (10 grams) having a width of 35 mm and a thickness of 5 mm, pickled in sweetened vinegar were arranged as sushi materials on the sheet of kelp, and a lump of vinegared boiled rice (240 grams) having a length of 180 mm, a width of 55 mm and a thickness of 24 mm was placed thereon and pressed from above. The resulting mass was turned upside down, and the frame member of the box was removed and further, the top lid member and the bottom plate member were removed, thereby withdrawing the pressed prawn and porgy sushi. The entire pressed prawn and porgy sushi withdrawn was wrapped with a wrapping film such as Saran Wrap (Trade name). The pressed prawn and porgy sushi wrapped with the wrapping film was inserted into a bag made of a laminate film comprised of an inner polyethylene film and an outer nylon film. The bag was degassed and thermally sealed at its mouth.

The sushi mass made through the packing and thermal sealing in the above manner was frozen using ethyl alcohol as brine, by retaining it in the brine at a temperature of −35° C. for 45 minutes. At this time, the temperature of the core of the packed and frozen pressed prawn and porgy sushi product was of −25° C. The packed and frozen pressed prawn and porgy sushi product made in this manner was preserved at a temperature of −28° C.

For the purpose of eating this packed and frozen compressed prawn and porgy sushi product (270 g), it was stored at a temperature of −21° C. in a freezer. The packed and frozen compressed prawn and porgy sushi product stored at this temperature of −21° C. was thawed by a microwave oven with a microwave output of 600 W. The thawing was performed by placing such packed frozen sushi product into the microwave oven and heating it for 3 minutes. The packed frozen sushi product thawed in this manner was removed from the microwave oven, and the temperatures of the vinegared boiled rice portion and the prawn and porgy portion of the pressed sushi having the tails of prawn and porgy as sushi materials were measured. The result showed that the temperature of the vinegared boiled rice portion was of 67.3° C. at its exposed side thereof and 31.6° C. at its bottom, and the temperature of the prawn and porgy portion was of 10.1° C. at its portion contacting with the back of the plastic film and 0.8° C. at its portion contacting with the vinegared boiled rice portion.

The packed and frozen compressed prawn and porgy sushi product thawed and removed from the microwave oven was left to stand at ambient temperature for 30 minutes, so that it was allowed to settle by its own heat. The temperature of the vinegared boiled rice portion and the prawn and porgy portion of this pressed prawn and porgy sushi product were measured. The result showed that the temperature of the vinegared boiled rice portion was of 34.4° C. at its exposed side thereof and 19.3° C. at its bottom, and the temperature of the prawn and porgy portion was of 22.1° C. at its portion contacting with the back of the plastic film and 18.1° C. at its portion contacting with the vinegared boiled rice.

For the packed and frozen compressed prawn and porgy sushi product thawed and removed from the microwave oven, which was left to stand at ambient temperature for 20 minutes, so that it was allowed to settle by its own heat, the measurement of the temperature of the vinegared boiled rice portion and the prawn and porgy portion of this pressed prawn and porgy sushi product showed that the temperature of the vinegared boiled rice portion was of 38.0° C. at its exposed side thereof and 21.5° C. at its bottom, and the temperature of the prawn and porgy portion was of 23.2° C. at its portion contacting with the back of the plastic film and 16.0° C. at its portion contacting with the vinegared boiled rice.

EXAMPLE 2

Using a box including a frame having a width of 55 mm and a length of 180 mm, a top lid member vertically movable within the frame, and a bottom plate member, an "oboro"-wrapped sushi product was made. In this example, a shaped form of vinegared boiled rice (120 g) had a shape 55 mm wide, 14 mm high and 180 mm long and a weight of 120 g, and was used on and under a sushi material.

For example, a lump of vinegared boiled rice (120 g) having a length of 180 mm, a width of 55 mm and a thickness of 24 mm was placed onto the bottom member of the box and pressed from above. 12 Sticks of crab (30 g) having a length of 65 mm, a width of 10 mm and a thickness of 3 mm, sprinkled with slat and pickled in vinegar were placed as a sushi material, and a shaped form of vinegared boiled rice (120 g) having a length of 180 mm, a width of 55 mm and a thickness of 24 mm was further placed thereon and pressed from above. The box was turned upside down, and the frame member is removed and further, the top lid member and the bottom plate member were removed, whereby the shaped mass (270 g) having the sticks of crab between the forms of vinegared boiled rice was removed. The all sides of the shaped mass removed was wrapped with an "oboro" flake of kelp (which means a particular flake of kelp made by shaving a piece of kelp), thereby producing an "oboro"-wrapped crab sushi. Then, the "oboro"-wrapped crab sushi was wrapped with a wrapping film such as Saran Wrap (Trade mane). The "oboro"-wrapped crab sushi was inserted into a bag made of a laminate film comprised of an inner polyethylene film and an outer nylon film. The bag was degassed and thermally sealed at its mouth.

The sushi packed and thermally sealed in this manner was brine-frozen by retaining it in ethyl alcohol used as brine at a temperature of −35° C. for 45 minutes to produce a packed and frozen "oboro"-wrapped crab sushi product. At this time, the temperature of the core in the packed and frozen "oboro"-wrapped crab sushi product was of −25° C. The packed and frozen "oboro"-wrapped crab sushi product made in the above manner was preserved at a temperature of −28° C.

For the purpose of eating the packed and frozen "oboro"-wrapped crab sushi product, it was stored at a temperature of −21° C. in a freezer. The packed and frozen "oboro"-wrapped crab sushi product stored at the temperature of −21° C. was thawed by a microwave oven with a microwave output of 600 W. The thawing was performed by placing the packed and frozen "oboro"-wrapped crab sushi product into the microwave oven and heating it for 3.5 minutes. The packed and frozen "oboro"-wrapped crab sushi product thawed in this manner was removed from the microwave oven, and the temperatures of the vinegared boiled rice portion and the crab portion were measured. The result showed that the temperature of the vinegared boiled rice portion was of 76.4° C. at its exposed side and 43.1° C. at its bottom, and the temperature of the crab portion was 14.3° C. at its portion contacting with the back of the plastic film and −0.3° C. at its portion contacting with the vinegared boiled rice.

The packed and frozen "oboro"-wrapped crab sushi product thawed and removed from the microwave oven was left to stand at ambient temperature for 40 minutes, so that it was allowed to settle by its own heat. The temperatures of the vinegared boiled rice portion and the crab portion of this "oboro"-wrapped crab sushi product were measured. The result showed that the temperature of the vinegared boiled rice portion was of 42.9° C. at its exposed side thereof and 17.4° C. at its bottom, and the temperature of the crab portion was of 18.3° C. at its portion contacting with the back of the plastic film and 15.7° C. at its portion contacting with the vinegared boiled rice.

For the packed "oboro"-wrapped crab sushi product thawed and removed from the microwave oven, which was left to stand at ambient temperature for 20 minutes, so that it was allowed to settle by its own heat, the measurement of the temperatures of the vinegared boiled rice portion and the prawn and porgy portion thereof showed that the temperature of the vinegared rice boiled portion was of 48.3° C. at its exposed side thereof and 18.1° C. at its bottom, and the temperature of the crab portion was of 15.9° C. at its portion contacting with the back of the plastic film and 8.4° C. at its portion contacting with the vinegared boiled rice.

EXAMPLE 3

For example, a lump of vinegared boiled rice (300 g) having a length of 180 mm, a width of 55 mm and a thickness of 35 mm, was mixed with tiny pieces of siitake (15 g) (which means Japanese mushroom) made by boiling up a siitake in a stock including sugar, soy sauce and sweet sake and then cutting it fine, and with tiny pieces of dried gourd shavings (15 g) made by boiling up dried gourd shavings in a stock including sugar, soy sauce and sweet sake and then cutting them fine. The boiled rice mixture was placed onto a belt of a thickly-rolled sushi making machine and chopped into 300 g. The lump of the boiled rice mixture was placed onto a thickly rolling belt of the thickly-rolled sushi making machine to produce a round rod-shaped thickly rolled form of the boiled rice mixture. This round rod-shaped thickly rolled form of the boiled rice mixture was placed into a box mold formed by a frame member having a width of 55 mm and a length of 180 mm and a top lid member vertically movable within the frame member, and a bottom plate member, and then pressed from above, thereby forming a shaped mass of vinegared boiled rice containing the sushi materials.

On the other hand, a piece of common conger eel (40 g) boiled up in a stock including sugar, soy sauce and sweet sake was placed onto a wrapping film such as Saran Wrap (Trade name), and the shaped mass of vinegared boiled rice containing the sushi materials was placed onto the piece of common conger eel, thereby making a rod-like common conger eel sushi. This common conger eel sushi was wrapped with a wrapping film.

The common conger eel sushi wrapped with the wrapping film was inserted into a bag made of a laminate film comprised of a inner polyethylene film and an outer nylon film, and the bag was degassed and thermally sealed at its mouth to pack the sushi with the film.

The rod-like common conger eel sushi packed and thermally sealed in the above manner was brine-frozen by retaining it in ethyl alcohol used as brine at a temperature of −35° C. for 45 minutes, thereby making a packed and frozen common conger eel sushi product. At this time, the core of the packed and frozen common conger eel sushi product made in this manner was preserved at a temperature of −28° C.

For the purpose of thawing the packed and frozen common conger eel sushi product, it was stored at a temperature of −18° C. in a freezer. The packed and frozen common conger eel sushi product stored at the temperature of −18° C. was thawed by heating in a microwave oven with a microwave output of 600 W. The thawing was performed by placing the common conger eel sushi product into the microwave oven and heating it for 3.5 minutes. The thawed common conger eel sushi product was removed from the microwave oven, and the temperatures of the vinegared boiled rice portion and the common conger eel portion were measured. The result showed that the temperature of the vinegared boiled rice portion was of 53.5° C. at its exposed side and 29.8° C. at its bottom, and the temperature of the common conger eel portion was of 6.5° C. at its portion contacting with the back of the plastic film and −3.4° C. at its portion contacting with the boiled rice portion. The thawed common conger eel sushi product removed from the microwave oven was allowed to settle by its own heat at −3.4° C. for 40 minutes, and the temperatures of the vinegared boiled rice portion and the common conger eel portion were measured. The result showed that the temperature of the vinegared rice portion was of 30.4° C. at its exposed side and 14.3° C. at its bottom, and the temperature of the common conger eel portion was of 17.3° C. at its portion contacting with the back of the plastic film and 12.8° C. at its portion contacting with the rice boiled portion.

For the thawed common conger eel sushi product removed from the microwave oven and allowed to settle by its own heat at ambient temperature for 20 minutes, the measurement of the temperatures of the vinegared boiled rice portion and the common conger eel portion showed that the temperature of the vinegared rice boiled portion was of 37.5° C. at its exposed side and 14.4° C. at its bottom, and the temperature of the common conger eel portion was of 10.0° C. at its portion contacting with the back of the plastic film and 4.6° C. at its portion contacting with the boiled rice portion.

The packed and frozen common conger eel sushi product stored at the temperature of −18° C. was heated and thawed for 4 minutes by a microwave oven with a microwave output of 600 W. The thawed common conger eel sushi product was removed from the microwave oven, and the temperatures of the vinegared boiled rice portion and the common conger eel portion were measured. The result showed that the temperature of the vinegared boiled rice portion was of 82.9° C. at its exposed side and 40.2° C. at its bottom, and the temperature of the common conger eel portion was of 6.9° C. at its portion contacting with the back of the plastic film and −3.3° C. at its portion contacting with the boiled rice portion. The common conger eel sushi product thawed and removed from the microwave oven was allowed to settle by its own heat at ambient temperature for 30 minutes, and the temperatures of the vinegared boiled rice portion and the common conger eel portion were measured. The result showed that the temperature of the vinegared boiled rice portion was of 41.7° C. at its exposed side and 19.8° C. at its bottom, and the temperature of the common conger eel portion was of 17.1° C. at its portion contacting with the back of the plastic film and 16.3° C. at its portion contacting with the boiled rice portion.

For the common conger eel sushi product thawed and removed from the microwave oven and allowed to settle by its own heat at ambient temperature for 20 minutes, the measurement of the temperatures of the vinegared boiled rice portion and the common conger eel portion showed that the temperature of the vinegared boiled rice portion was of 46.6° C. at its exposed side and 20.0° C. at its bottom, and the temperature of the common conger eel portion was of 14.3° C. at its portion contacting with the back of the plastic film and 12.6° C. at its portion contacting with the boiled rice portion.

EXAMPLE 4

A shaped form of boiled rice having a size 55 mm wide, 30 mm high and 180 mm long and a weight of 300 g was used.

For example, a white thin sheet of kelp having a length of 185 mm, a width of 70 mm and a thickness of 0.8 mm and made by boiling up a piece of kelp in a stock including vinegar, sugar and salt was placed onto a wrapping film such as Saran Wrap (Trade name), and a piece (100 g) of a boned mackerel having a width of 80 mm and a thickness of 15 mm, sprinkled with slat and pickled in vinegar, was placed as a sushi material onto the sheet of kelp. The shaped form of rice (300 g) was placed onto the piece of mackerel, and the resulting mass was wrapped with the wrapping film, thereby forming a mackerel sushi. An aluminum foil was placed onto the entire sushi material of the sushi wrapped with the wrapping film, and the resulting sushi mass was inserted into a bag made of a laminate film comprised of an inner polyethylene film and an outer nylon film. The bag was degassed and thermally sealed at its mouth.

The mackerel sushi product packed and thermally sealed in the above manner was brine-frozen by retaining it in ethyl alcohol used as brine at −35° C. for 45 minutes. At this time, the temperature of the core of the packed and frozen mackerel sushi product was of −25° C. The packed and frozen mackerel sushi product made in the above manner was preserved at −28° C.

In using the packed and frozen mackerel sushi product (400 g), it was stored at a temperature of −21° C. in a freezer. The packed and frozen mackerel sushi product stored at the temperature of −21° C. was thawed by a microwave oven with a microwave output of 600 W. The thawing was performed by placing the mackerel sushi product into the microwave oven and heating it for 4.5 minutes. The thawed mackerel sushi product was removed from the microwave oven and the temperatures of the vinegared boiled rice portion and the mackerel portion were measured. The result showed that the temperature of the vinegared boiled rice portion was of 50.5° C. at its exposed side and 47.6° C. at its bottom, and the temperature of the mackerel portion was of 14.7° C. at its portion contacting with the back of the aluminum foil and 4.0° C. at its portion contacting with the boiled rice portion.

The mackerel sushi product thawed and removed from the microwave oven was allowed to settle by its own heat at ambient temperature for 40 minutes, and the temperatures of the boiled rice portion and the mackerel portion were measured. The result showed that the temperature of the boiled rice portion was of 27.8° C. at its exposed side and 23.1° C. at its bottom, and the temperature of the mackerel portion was of 22.7° C. at its portion contacting with the back of the aluminum foil and 20.1° C. at its portion contacting with the boiled rice portion.

For the mackerel sushi product thawed and removed from the microwave oven and allowed to settle by its own heat at ambient temperature for 30 minutes, the measurement of the temperatures of the boiled rice portion and the mackerel portion showed that the temperature of the boiled rice portion was of 28.0° C. at its exposed side and 21.5° C. at its bottom, and the temperature of the mackerel portion was of 21.5° C. at its portion contacting with the back of the aluminum foil and 18.0° C. at its portion contacting with the boiled rice portion.

EXAMPLE 5

In a packed and frozen crab sushi product (300 g) in this example, a plastic film bag used was a bag made of a double laminate plastic film which was comprised of an outer nylon film having an aluminum foil deposited on a portion of an inner side thereof, and a polyethylene film affixed on an inner side of the aluminum foil.

The crab sushi wrapped with a wrap was inserted into the bag made of the laminate film comprised of the inner polyethylene film and the outer nylon film having the aluminum foil deposited on a portion of the inner side thereof. The resulting bag was degassed and thermally sealed at its mouth.

The crab sushi product packed and thermally sealed in the above manner was brine-frozen by retaining it in ethyl alcohol used as brine at a temperature of −35° C. At this time, the temperature of the core of the packed and frozen crab sushi product was of −25° C. The packed and frozen crab sushi product made in this manner was preserved at a temperature of −28° C.

In thawing the packed and frozen crab sushi product, it was stored at a temperature of −21° C. in a freezer. The packed and frozen crab sushi product stored at the temperature of −21° C. was thawed by a microwave oven. The thawing was performed by placing the packed and frozen crab sushi product into the microwave oven and heating it for 3.5 minutes. The packed and frozen crab sushi product thawed was removed from the microwave oven, and the temperatures of the boiled rice portion and the crab portion were measured. The result showed that the temperature of the boiled rice portion was 56.4° C. at its exposed portion and 36.4° C. at its bottom portion, and the temperature of the crab portion was of 11.4° C. at its portion contacting the back of the aluminum foil and 5.5° C. at its portion contacting with the boiled rice portion.

The packed and frozen crab sushi product thawed and removed from the microwave oven was allowed to settle by its own heat at ambient temperature for 30 minutes, and the temperatures of the boiled rice portion and the crab portion were measured. The result showed that the temperature of the boiled rice portion was 35.6° C. at its exposed portion and 26.2° C. at its bottom portion, and the temperature of the crab portion was of 20.9° C. at its portion contacting the back of the aluminum foil and 18.4° C. at its portion contacting with the boiled rice portion.

In Examples 4 and 5, the bag having the aluminum foil deposited on a portion of the inner side of the nylon film was used, but an aluminum foil may be formed by plating in place of the depositing. A bag having aluminum foil deposited or plated on the entire inner side of an nylon film may be also used. In this case, the bag is formed into a size to cover the sushi material by the aluminum foil.

What is claimed is:

1. A packed frozen food product packed by plastic films comprising:

a frozen sushi product formed by at least one shaped form of frozen boiled rice and a frozen sushi material placed on an upper surface of each form of said at least one shaped form of frozen boiled rice;

a first layer of plastic film tightly, directly and entirely surrounding said frozen sushi product;

an aluminum foil placed directly and tightly on a sushi material portion of said first layer of plastic film surrounding said frozen sushi material; and a second layer of plastic film covering directly and tightly the upper surface of said aluminum foil lying on the sushi material portion and the surface of the first layer of plastic film except for that portion of the first layer of plastic film that is covered with aluminum foil.

2. A packed frozen food product packed by plastic films according to claim 1, wherein said at least one shaped form of frozen boiled rice comprises at least two shaped forms of frozen boiled rice, and in which the frozen sushi material placed on the upper surfaces of at least two shaped forms of frozen boiled rice is surrounded directly and tightly with said first layer of plastic film.

3. A process for thawing a packed frozen food product comprising the steps of:

heating the packed frozen food product that includes at least one shaped form of frozen boiled rice having a frozen sushi material placed thereon, and packaged by packing plastic films with an aluminum foil disposed between only a portion of the plastic films in an area adjacent the sushi material, by electromagnetic wave heating, while shielding the sushi material from electromagnetic waves with the aluminum foil, thereby heating an exposed side of said shaped form of boiled rice to a temperature of about 40° C. or more, while heating a contact area between said sushi material and said shaped form of boiled rice to a temperature of about 15° C. or less; and stopping the electromagnetic wave heating, to heat said sushi material with heat energy possessed by said shaped form of rice, until the temperature of said contact area between said sushi material and said shaped form of boiled rice reaches a level higher than 15° C.

4. A process for thawing a packed frozen food product according to claim 3, wherein said at least one shaped form of frozen boiled rice comprises at least two shaped forms of frozen boiled rice, and in which the frozen sushi material placed on the upper surfaces of at least two shaped forms of frozen boiled rice is surrounded directly and tightly with said first layer of plastic film.

* * * * *